United States Patent [19]
Bruckert et al.

[11] Patent Number: 5,446,727
[45] Date of Patent: Aug. 29, 1995

[54] METHOD AND APPARATUS FOR TIME ALIGNING SIGNALS FOR RECEPTION IN A CODE-DIVISION MULTIPLE ACCESS COMMUNICATION SYSTEM

[75] Inventors: Eugene J. Bruckert, Arlington Heights; Richard A. Sonnentag, Lake Zurich, both of Ill.

[73] Assignee: Motorola Inc., Schaumburg, Ill.

[21] Appl. No.: 159,633

[22] Filed: Nov. 30, 1993

[51] Int. Cl.6 ............... H04J 13/00; H04J 3/06
[52] U.S. Cl. ................... 370/18; 370/100.1; 455/51.1
[58] Field of Search ............ 370/18, 19, 100.1, 103, 370/104.1, 95.1; 375/107, 109; 455/51.1, 51.2

[56] References Cited

U.S. PATENT DOCUMENTS

| | | | |
|---|---|---|---|
| 4,688,210 | 8/1987 | Eizenhofer et al. | 370/18 |
| 4,893,318 | 1/1990 | Potash et al. | 375/109 |
| 5,164,958 | 11/1992 | Omura | 375/1 |
| 5,257,404 | 10/1993 | Goreham et al. | 375/109 |
| 5,317,571 | 5/1994 | Marcel et al. | 370/103 |

OTHER PUBLICATIONS

Kajiwara, Akihiro, "On Synchronous CDMA for Mobile Communications", Department of Systems & Computer Engineering, Carleton University, Ottawa, Canada, K1S 5B6, 1992 IEEE, pp. 858–862.

Primary Examiner—Douglas W. Olms
Assistant Examiner—Min Jung
Attorney, Agent, or Firm—Richard A. Sonnentag

[57] ABSTRACT

A coherent reverse channel, a per-chip spreading function, orthogonal spreading functions and a time alignment of all traffic channels are implemented such that the main signal of each channel arrives at a base-station within a fraction of a chip of one another in accordance with the invention. With this, the orthogonality among all channels is maintained, and, when demodulated, all channels except the channel of interest provides a cross-correlation of substantially zero with respect to the remaining signals.

18 Claims, 2 Drawing Sheets

METHOD AND APPARATUS FOR TIME ALIGNING SIGNALS FOR RECEPTION IN A CODE-DIVISION MULTIPLE ACCESS COMMUNICATION SYSTEM

FIELD OF THE INVENTION

The invention relates generally to communication systems, and more particularly to time aligning signals for reception in code-division multiple access communication systems.

BACKGROUND OF THE INVENTION

In code-division multiple access (CDMA) communication systems, communication between a base-station and a subscriber unit is accomplished by spreading each transmitted signal over the frequency band of the communication channel with a unique user spreading code. As a result, transmitted signals are in the same frequency band of the communication channel and are separated only by the unique user spreading codes. These unique user spreading codes preferably are orthogonal to one another such that the cross-correlation between the spreading codes is substantially zero.

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are significantly de-emphasized.

To maintain orthogonality among all channels, the channels must be substantially time aligned on a per-chip basis. For forward channel transmission (from base-station to subscriber unit), this time alignment is easily obtained via a synchronized process of combining the traffic channels together at each basestation. However, time alignment of reverse channel signals (from subscriber units to a particular base-station) is not as simple due to the time-randomness of transmissions by subscriber units. Attempts have been made to synchronize the reverse channel signals at a base-station, but such attempts require extra circuitry at the base-station, which in turn leads to both increased complexity and added cost to the base-station.

Thus, a need exists for a simple and cost effective method and apparatus for time aligning signals for reception in a CDMA communication system.

DETAILED DESCRIPTION OF A PREFERRED EMBODIMENT

A coherent reverse channel, a per-chip spreading function, orthogonal spreading functions and a time alignment of all traffic channels are implemented such that the main signal of each channel arrives at a base-station within a fraction of a chip of one another in accordance with the invention. With this, the orthogonality among all channels is maintained, and, when demodulated, all channels except the channel of interest provides a cross-correlation of substantially zero with respect to the remaining signals. In this way, at least 3 dB of extra sensitivity can be achieved in typical CDMA communication systems, and as much as 10 dB in a personal communication system (PCS) environment where delay spread effects are less likely to be encountered.

Figure 1:
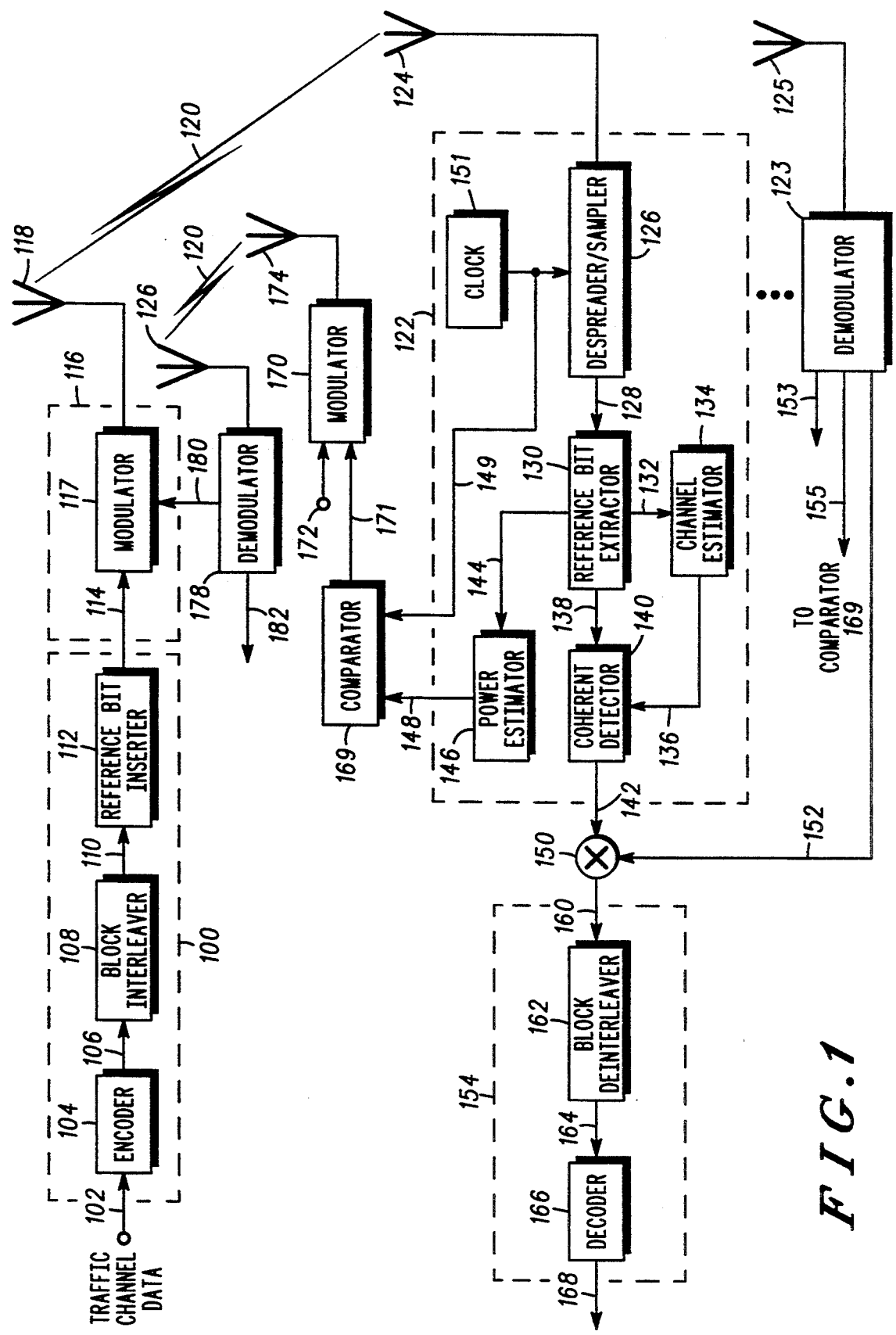
FIG. 1 generally depicts, in block diagram form, a communication system in accordance with the invention.

FIG. 1 generally depicts, in block diagram form, a communication system in accordance with the invention. In the preferred embodiment, the communication system of FIG. 1 is the coherent communication system substantially shown and described in patent application Ser. No. 08/031,258, entitled "Method and Apparatus for Coherent Communication in a Spread Spectrum Communication System," filed Mar. 11, 1993, invented by Fuyun Ling and herein incorporated by reference. Additionally shown in FIG. 1 is comparator 169, modulator 170, demodulator 178 and clock 151.

Comparator 169 has as input a clock signal 149 output from clock 151 and a power estimate signal 148 output from power estimator 146. In the preferred embodiment, power estimator 146 utilizes a sum and square technique to perform power estimation, which is well known in the art. During operation, demodulator 122 outputs signals 148 and 149 (as does, inter alia, demodulator 123 with it's corresponding clock signal 153 and power estimate signal 155) to comparator 169 where the signal with the strongest estimated power is determined. In the preferred embodiment, four demodulators are utilized to receive a single transmission from a subscriber unit. Each demodulator demodulates a delayed ray of the subscriber unit's transmission based on an assignment determined by the energy of the delayed ray. While not separately shown, each of the four demodulators may be switched between any of a plurality of antennas coupled to a base-station. Continuing, the clock signal from the demodulator having the strongest estimated power is then utilized to compare, in comparator 169, the time of arrival of that delayed ray received with a reference value so as to determine a time position for each signal. Two rays having substantially the same delay will be combined in comparator 169 before comparison to the reference value. In addition, a mean of the times of arrival of the plurality (four) delayed rays which are representative of the signal may likewise be utilized for comparison to the reference value in comparator 169.

In the preferred embodiment, the reference value may be an (absolute) expected time of arrival for the signal (i.e., a single subscriber unit's transmission) or a value related to the time of arrivals of signals with respect to one another (i.e., a group of subscriber unit transmissions). For example, a value related to the time of arrival of signals with respect to one another could be the mean of the time of arrival of all signals (and/or their delayed rays), the latest of the time of arrival of all signals, etc. As one of ordinary skill in the art will appreciate, many characteristics/combinations of the signals/rays exist to determine the reference value.

Once the time position of the signal is determined, comparator 169 produces an alignment signal 171 which is transmitted to a subscriber unit, such as a subscriber unit comprised of, inter alia, blocks 100 and 116. The subscriber unit receives the alignment signal, adjusts a clock based on the alignment signal, and transmits information to a base-station utilizing the adjusted clock. In this manner, the technique in accordance with the invention is utilized to either advance/retard a subscriber unit's transmission as seen by the base-station.

In the preferred embodiment, operation of modulator 170 is substantially equivalent to the operation of modulator 117. Alignment signal 171 is input into modulator 170, as is signal 172 (substantially equivalent to signal 114). Modulator 170 then transmits, inter alia, alignment signal 171 to the corresponding subscriber unit (and other alignment signals to other corresponding subscriber units) such that any subsequent signals transmitted by the plurality of subscriber units are received by the base-station substantially in time alignment.

In the preferred embodiment, alignment signal 171 may be produced in several ways. First, it may be produced as a message. In IS 95, published by Telecommunications Industry Association, 2001 Pennsylvania Avenue NW, Washington, D.C., there is a provision titled "Ordered Messages" which allows an equipment manufacturer to create custom messages. For alignment signal 171 in accordance with the invention, the message may look like the message found in Table 1 below:

TABLE 1

| Paging Channel Order | Forward Traffic Channel Order | Order Code, ORDER (binary) | Order Qual. Code ORDQ (binary) | ACTION TIME can be specified ORDQ | Additional Fields other | Name/Func. |
| --- | --- | --- | --- | --- | --- | --- |
| No | Yes | 011111 | snnnnnnn | No | No | Time Align. Order | where nnnnnnn is a timing value field having the value of the timing change (in nanoseconds) and s is a polarity change field having the polarity of the change (advance/retard). The message would be transmitted on the forward traffic channel with an order code (for example) of "011111", and be titled "Time Alignment Order."

Figure 2:
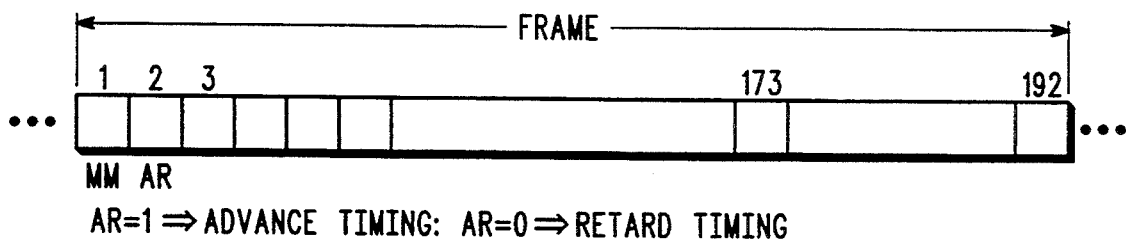
FIG. 2 generally depicts a forward channel frame having an advance/retard bit inserted therein in accordance with the invention.

A second embodiment would incorporate an advance/retard bit inserted into a forward channel frame as shown in FIG. 2. The frame would be a modified version of the forward channel frame defined in the IS 95 standard. At bit position 1, when message mode (MM) is a "0", a subscriber unit would know that an advance/retard is required. At bit position 2, advance/retard (AR) bit would indicate which action is to be taken; if AR="1", then advance timing and if AR="0", then retard timing. Typically, the timing change is a small fraction of a chip (for example, less than 1/10$^{th}$ of the period of the chip).

For each subscriber unit within the communication system, there is a unique spreading code associated therewith. When a base-station transmits an alignment signal 171 to each particular subscriber unit, each subscriber unit will advance/retard its transmission so that any subsequent transmission will be time aligned when received and demodulated by the base-station.

Figure 3:
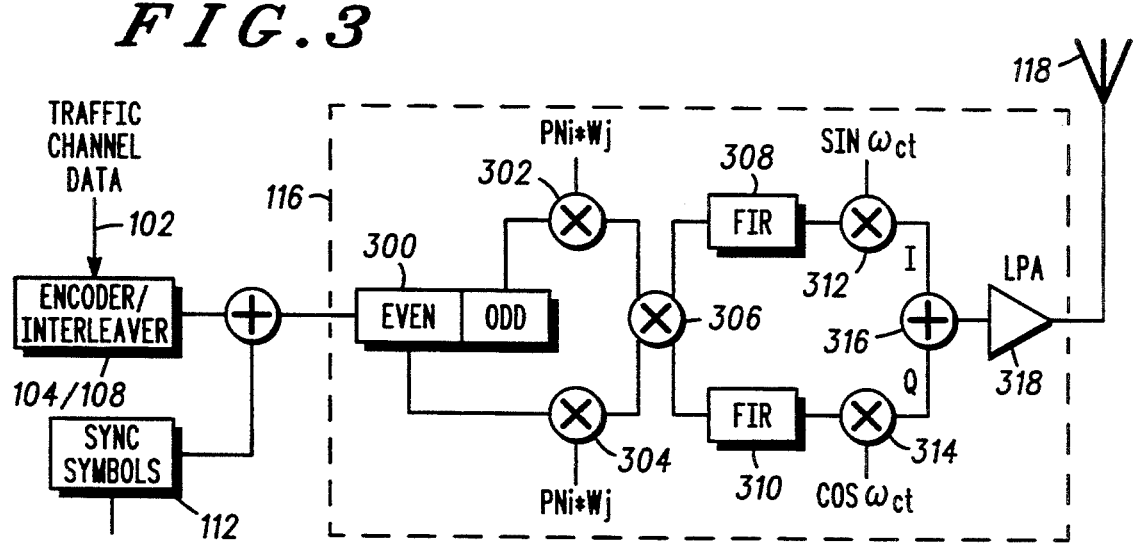
FIG. 3 generally depicts, in block diagram form, an alternate embodiment of a transmitter which may be employed in accordance with the invention.

FIG. 3 generally depicts, in block diagram form, an alternate embodiment of a transmitter which may be employed in accordance with the invention. In this embodiment, transmitting portion 116 comprises a quadrature phase shift keyed (QPSK) modulator, as is well known in the art, coupled to a linear power amplifier (LPA) 318. Transmitter portion 116 of FIG. 3 can likewise be implemented utilizing a $\pi/4$ QPSK modulator if circuit 306 rotates the phase by $\pi/4$ radians every chip. One skilled in the art would also recognize that transmitter portion 116 can be readily adapted to implement offset QPSK modulation.

As is well known to one of ordinary skill in the art, CDMA communication systems employ soft hand-off. In a soft hand-off situation, a subscriber unit receives (synchronized) transmissions from more than one base-station. As such, a subscriber unit receiving the alignment signal transmitted in accordance with the invention, in a preferred embodiment, would receive multiple transmissions but only follow the advance/retard command contained within one of the transmissions (for example, the transmission having it the strongest power as seen by the subscriber unit). In an alternate embodiment, a subscriber unit could be instructed by a base-station to follow the timing commands of a particular one of the base-stations received.

Figure 4:
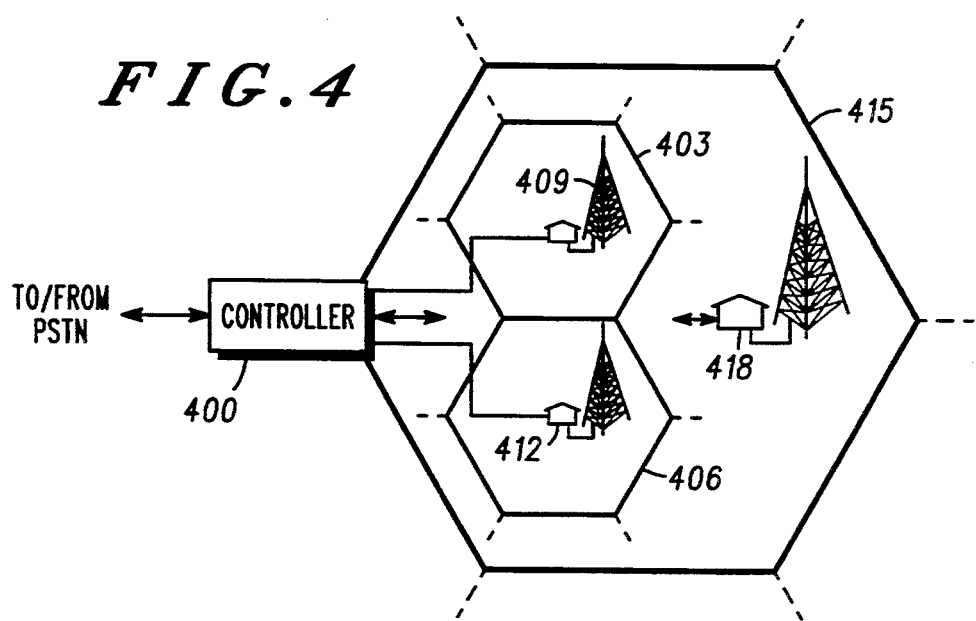
FIG. 4 generally depicts, a typical microcellular system.

Time alignment in accordance with the invention is applicable to a typical microcellular system as depicted in FIG. 4 where a controller 400 couples base-stations 409, 412 in microcells 403, 406, respectively, to one another. Also depicted in FIG. 4 is a cell 415 of a cellular system having a base-station 418 likewise coupled to controller 400 (the coupling link is not shown). In typical microcellular systems, the cell 403, 406 is substantially smaller than the cell 415 of a traditional cellular system as can be seen in FIG. 4.

As a consequence, timing advance/retard is not usually a concern in microcellular systems since, due to the small size of the cell, transmissions of individual subscriber units within a microcell 403 or 406 arrive substantially in time alignment. However, adjacent microcells 403, 406 still present interference between one another as occurs in adjacent cells of cellular systems. Consequently, the value related to the time of arrivals of signals with respect to one another may be used to adjust an entire group of subscriber unit transmissions (within a particular microcell) by a common time, so that the principal of orthogonality may be beneficially utilized between adjacent microcells. For example, if orthogonal spreading codes are implemented between microcells (as compared to orthogonal spreading codes implemented between subscriber units), an adjustment to substantially time align an entire group of subscriber unit transmissions (within a particular microcell) with an entire group of subscriber unit transmissions (within an adjacent microcell) would provide the orthogonality benefits between microcells as is seen between subscriber units in the above preferred embodiment. In this alternate embodiment, comparator 169, for each receiver demodulating a single subscriber unit's transmission, would have an output (not shown) which would be input into controller 400. Controller 400 would determine a "group" time of alignment signal, and command base-stations 409, 412 to have each subscriber unit in the group adjust accordingly. By adjusting the entire group within a microcell 403, 406, the principal of orthogonality may be beneficially utilized between adjacent microcells so that any cross-correlation between microcells is substantially zero. One example, inter alia, of an application of group time advance/retard would be to time advance/retard a group of subscribers in a lightly loaded microcell to the benefit of a heavily loaded microcell.

While the invention has been particularly shown and described with reference to a particular embodiment, it will be understood by those skilled in the art that various changes in form and details may be made therein without departing from the spirit and scope of the invention.

What I claim is:

1. A method of time aligning signals for reception in a code-division multiple access (CDMA) communication system, the method comprising the steps of:
   receiving, at a base-station, signals transmitted by a plurality of subscriber units;
   determining a time position of each signal received based on estimates of the power of a plurality of delayed rays representative of each signal; and
   transmitting, from the base-station, an alignment signal, based on the step of determining, to each of the plurality of subscriber units such that subsequent signals transmitted by the plurality of subscriber units are received by the base-station substantially in time alignment.

2. The method of claim 1 wherein the subsequent signals transmitted by the plurality of subscriber units and received by the base-station substantially in time alignment are modulated with spreading codes which are orthogonal to one another.

3. The method of claim 2 wherein reception and a demodulation of one of the subsequently transmitted signals provides a cross-correlation of substantially zero with respect to the remaining subsequently transmitted signals.

4. The method of claim 1 wherein the step of determining a time position of each signal received based on estimates of the power of a plurality of delayed rays representative of the signal further comprises the step of determining a time position of each signal received based on the time of arrival of the strongest of the estimates of the power of a plurality of delayed rays representative of the signal.

5. The method of claim 1 wherein the step of determining a time position of each signal received based on estimates of the power of a plurality of delayed rays representative of the signal further comprises the step of determining a time position of each signal received based on the mean of the times of arrival of the plurality of delayed rays representative of the signal.

6. A method of time aligning signals for reception in a code-division multiple access (CDMA) communication system, the method comprising the steps of:
   receiving, at a base-station, signals transmitted from a plurality of subscriber units, each signal modulated with a per symbol spreading function orthogonal to one another;
   determining a time position of each signal received based on estimates of the power of a plurality of delayed rays representative of each signal; and
   transmitting, from the base-station, an alignment signal, based on the step of determining, to each of the plurality of subscriber units such that subsequent signals transmitted by the plurality of subscriber units are received by the base-station substantially within a fraction of a chip of one another.

7. The method of claim 6 wherein reception and a demodulation of one of the subsequently transmitted signals provides a cross-correlation of substantially zero with respect to the remaining subsequently transmitted signals.

8. The method of claim 6 wherein the step of transmitting an alignment signal further comprises the step of transmitting a distinct alignment signal to each of the plurality of subscriber units.

9. A base-station for time aligning signals for reception in a code-division multiple access (CDMA) communication system, the base-station comprising:
   means for receiving signals transmitted by a plurality of subscriber units;
   means, coupled to the means for receiving, for determining a time position of each signal received based on estimates of the power of a plurality of delayed rays representative of each signal; and
   means, coupled to the means for determining, for transmitting an alignment signal to each of the plurality of subscriber units such that subsequent signals transmitted by the plurality of subscriber units are received by the base-station substantially in time alignment.

10. The base-station of claim 9 wherein the means for determining further comprises a comparator for comparing a time of arrival of each signal received with an expected time of arrival for each signal to determine a time position for each signal.

11. The base-station of claim 9 wherein the means for determining a time position of each signal received based on estimates of the power of a plurality of delayed rays representative of the signal further comprises means for determining a time position of each signal received based on the time of arrival of the strongest of the estimates of the power of a plurality of delayed rays representative of the signal.

12. The base-station of claim 9 wherein the means for determining a time position of each signal received based on estimates of the power of a plurality of delayed rays representative of the signal further comprises means for determining a time position of each signal received based on the mean of the times of arrival of the plurality of delayed rays representative of the signal 13. A base-station for time aligning signals for reception in a code-division multiple access (CDMA) communication system, the base-station comprising:
   a receiver for receiving signals transmitted by a plurality of subscriber units;
   a comparator, coupled to the receiver, for determining a time position of each signal received based on estimates of the power of a plurality of delayed rays representative of each signal; and
   a transmitter, coupled to the means for determining, for transmitting an alignment signal to each of the plurality of subscriber units such that subsequent signals transmitted by the plurality of subscriber units are received by the base-station substantially in time alignment.

14. The base-station of claim 13 wherein the alignment signal further comprises an advance/retard bit periodically transmitted to each of the plurality of subscriber units.

15. The base-station of claim 13 wherein the alignment signal further comprises a message containing at least a timing value field and a polarity field.

16. A method of time aligning signals for reception in a microcellular code-division multiple access (CDMA)

communication system, the method comprising the steps of:

receiving, at base-stations within first and second microcells, signals transmitted by first and second groups of subscriber units;

determining, for each group of signals, a time position of the signals within the group received relative to one another;

comparing the time position for each group; and transmitting, from either the first or second base-station, an alignment signal, based on the step of comparing, to the corresponding first or second group of subscriber units such that subsequent signals transmitted by the group of subscriber units are received by the base-station within the first or second microcell substantially in time alignment with signals received by the basestation within the other microcell.

17. The method of claim 16 wherein said first and second microcells are adjacent.

18. The method of claim 16 wherein the step of comparing the time position for each group further comprises the step of comparing the time position for :each group to a reference value.

* * * * *